(12) United States Patent
Gounares et al.

(10) Patent No.: US 10,127,160 B2
(45) Date of Patent: Nov. 13, 2018

(54) METHODS AND SYSTEMS FOR BINARY SCRAMBLING

(71) Applicants: Alexander Gounares, Kirkland, WA (US); Christopher Warwick Fraser, Seattle, WA (US); Steven Craig Venema, Issaquah, WA (US)

(72) Inventors: Alexander Gounares, Kirkland, WA (US); Christopher Warwick Fraser, Seattle, WA (US); Steven Craig Venema, Issaquah, WA (US)

( * ) Notice: Subject to any disclaimer, the term of this patent is extended or adjusted under 35 U.S.C. 154(b) by 0 days.

(21) Appl. No.: 15/685,600

(22) Filed: Aug. 24, 2017

(65) Prior Publication Data
US 2018/0081826 A1    Mar. 22, 2018

Related U.S. Application Data

(63) Continuation-in-part of application No. 15/270,474, filed on Sep. 20, 2016.

(51) Int. Cl.
*G06F 12/14* (2006.01)
*G06F 21/14* (2013.01)
*G06F 8/41* (2018.01)

(52) U.S. Cl.
CPC .......... *G06F 12/1408* (2013.01); *G06F 21/14* (2013.01); *G06F 8/425* (2013.01); *G06F 8/43* (2013.01); *G06F 8/4434* (2013.01); *H04L 2209/16* (2013.01)

(58) Field of Classification Search
CPC .... G06F 12/1408; G06F 21/14; G06F 8/4434; G06F 8/43; G06F 8/425; G06F 12/14; H04L 2209/16

USPC .................................................. 713/17, 171
See application file for complete search history.

(56) References Cited

U.S. PATENT DOCUMENTS

| | | | | |
|---|---|---|---|---|
| 7,434,213 B1* | 10/2008 | Prakash | .................... | G06F 8/41 717/152 |
| 7,610,484 B2* | 10/2009 | Kapoor | .................... | H04L 9/006 380/278 |
| 2004/0030888 A1* | 2/2004 | Roh | .................... | H04L 63/0823 713/156 |
| 2005/0183072 A1* | 8/2005 | Horning | .................. | G06F 21/14 717/140 |
| 2005/0289264 A1* | 12/2005 | Illowsky | ............... | G06F 1/3203 710/104 |
| 2007/0143407 A1* | 6/2007 | Avritch | ................ | G06Q 10/107 709/206 |
| 2007/0179941 A1* | 8/2007 | Huang | .............. | G06F 17/30427 |
| 2008/0118070 A1* | 5/2008 | Yeap | ................... | H04L 63/0823 380/282 |
| 2008/0126766 A1* | 5/2008 | Chheda | ............... | G06F 9/30003 712/226 |
| 2008/0250399 A1* | 10/2008 | Huang | .................... | G06F 8/443 717/151 |
| 2009/0060176 A1* | 3/2009 | Yokota | .................. | H04L 9/0662 380/28 |
| 2009/0089579 A1* | 4/2009 | Murase | ................. | G06F 21/575 713/164 |
| 2009/0144561 A1* | 6/2009 | Davidson | ................ | G06F 21/50 713/190 |

(Continued)

*Primary Examiner* — Abu S Sholeman
(74) *Attorney, Agent, or Firm* — John Weatherspoon, Esq.

(57) ABSTRACT

The present invention relates to methods and systems for binary scrambling, and applications for cybersecurity technology aimed at preventing cyber-attacks.

1 Claim, 5 Drawing Sheets

(56) References Cited

U.S. PATENT DOCUMENTS

| | | | | |
|---|---|---|---|---|
| 2009/0271627 | A1* | 10/2009 | Cohen | H04L 9/0836 713/171 |
| 2009/0327714 | A1* | 12/2009 | Yaghmour | H04L 51/30 713/168 |
| 2010/0287622 | A1* | 11/2010 | Petkov | G06F 21/125 726/29 |
| 2012/0204032 | A1* | 8/2012 | Wilkins | H04L 9/006 713/170 |
| 2012/0284688 | A1* | 11/2012 | McLachlan | G06F 21/125 717/110 |
| 2012/0324482 | A1* | 12/2012 | Park | G06F 9/541 719/328 |
| 2013/0086625 | A1* | 4/2013 | Driscoll | G06F 21/52 726/1 |
| 2014/0143865 | A1* | 5/2014 | Collard | G06F 21/64 726/22 |
| 2016/0080380 | A1* | 3/2016 | Dawoud Shenouda Dawoud | H04L 63/0876 713/156 |
| 2016/0301676 | A1* | 10/2016 | Gounares | H04L 63/08 |
| 2018/0109504 | A1* | 4/2018 | Poffenbarger | H04L 63/0485 |

* cited by examiner

US 10,127,160 B2

METHODS AND SYSTEMS FOR BINARY SCRAMBLING

This U.S. utility patent application is a continuation-in-part of U.S. patent application Ser. No. 15/270,474, which was filed on Sep. 20, 2016. This confirmation-in-part patent application therefore claims priority to U.S. patent application Ser. No. 15/270,474, which was filed on Sep. 20, 2016. The entire disclosure of U.S. patent application Ser. No. 15/270,474 is incorporated herein in its entirety.

FIELD OF THE INVENTION

The present invention relates to methods and systems for binary scrambling, and applications for cybersecurity technology aimed at preventing cyber-attacks.

BACKGROUND OF THE INVENTION

As the world becomes increasingly digital, and digitally connected, cyber security continues to grow in importance. In today's world, cyber security is unfortunately asymmetric—and it favors the attacker. One fundamental aspect of the asymmetry today is the inherent "break once, run many" nature of contemporary systems.

This 'break once, run many' nature makes the economics of cyber-attacks significantly favor the attacker. The effort applied to find and develop and exploit can be leveraged across a large number of targets. Often times these attacks can be launched remotely from anywhere in the work). To make a cyber-attack worthwhile, the only remaining question is the value of the targeted data or systems.

Malware, or malicious software, is often linked to cyber-attacks. Cyber attackers often take advantage of vulnerabilities in computer programs, and are thus able to infect, damage and often disable the programs with computer viruses, malware and other malicious code.

One common set of techniques for writing malware uses approaches like return oriented programming (ROP) and jump oriented programming (JOP) to literally trick the target into behaving the way the attacker desires. In essence, the victim becomes the virus. Malware based on these techniques can be extremely hard to detect, and as a result, many "Zero Day" malware attacks are based on these techniques.

Fundamentally, malware based on these techniques requires knowledge of the target system. In simple terms, in order to 'trick' the victim into becoming the virus, the attacker needs to know very specific details about the victim, including but not limited to, the specific binary instructions used by the victim program.

Prior to this invention, the state of the art to defend against ROP/JOP style attacks was address space layout randomization (ASLR). The goal of this approach is to randomly move binaries into different memory locations, making it more difficult for attackers to know where to find the code needed to create the virus. This approach, while worthwhile, is fairly easy to work around—simply figuring out one number (e.g. a single memory address) is often sufficient to completely defeat ASLR defenses.

There is a long-felt, significant and unmet need in the art for improved methods and systems for preventing and disabling the unwarned effects of malware. As long as targets remain sialic, attackers will be able to exploit vulnerabilities economically, it is not sufficient to just move binaries around, the binaries themselves need to be different across systems.

SUMMARY OF THE INVENTION

Various aspects of the present invention provide systems and methods for scrambling binary executables via randomization at the level of a compiler.

Another aspect of the present invention presides a method and a compiler for compiling a source program, such that the object code that is generated by the compiler for each file in the source program comprises scrambled binary output.

Another aspect of the invention provides a method of protecting against, attacks by malware and computer viruses, comprising compiling a source program with a compiler, such that object code that is generated by the compiler for each file in the source program comprises scrambled binary data.

Yet another aspect of the invention provides a method of compiling a source program, comprising compiling each file in the source program with a compiler, and scrambling the binary output for each file that is compiled.

Yet another aspect of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output.

Yet another aspect of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output and further wherein the compiler includes a technique for randomizing register allocation, and further wherein the method requires operation of at least one additional physical component of computer hardware architecture or microarchitecture which is absolutely and unequivocally essential and required to specifically perform the technique for randomizing register allocation.

Yet another aspect of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing function layout in the binary output, and further wherein the method requires operation of at least one additional physical component of computer hardware architecture or microarchitecture which is absolutely and unequivocally essential and required to specifically perform the technique for randomizing function layout in the binary output.

Yet another aspect of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code far each file in the source program, and a binary scrambling component for generating the scrambled binary output, and further wherein, the method requires operation of at least one physical component of computer hardware architecture or microarchitecture which is absolutely and unequivocally essential and required for generating the scrambled binary output and further wherein the compiler includes a technique for randomizing loop unrolling in the binary output, and further wherein the method requires operation of at least one additional physical component of computer hardware architecture or microarchitecture which is absolutely and unequivocally essential, and required to specifically perform the technique for randomizing loop unrolling in the binary output.

Yet another aspect of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program and a binary scrambling component for generating the scrambled binary output and further wherein the method requires operation of at least one physical component of computer hardware architecture or microarchitecture which is absolutely and unequivocally essential and required for generating the scrambled binary output and further wherein the compiler includes a technique for randomizing import tables in the binary output, and further wherein the method requires operation of at least one additional physical component of computer hardware architecture or microarchitecture which is absolutely and unequivocally essential and required to specifically perform the technique for randomizing import tables in the binary output.

Yet another aspect of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output and further wherein the compiler includes a technique for introducing chaff code in the binary output and further wherein the method requires operation of at least one additional physical component of computer hardware architecture or microarchitecture which is absolutely and unequivocally essential and required to specifically perform the technique for introducing chaff code in the binary output.

Yet another aspect of the invention provides a method of protecting against, attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least, one physical component of computer hardware architecture or microarchitecture which is absolutely and unequivocally essential and required for generating the scrambled binary output, and further wherein the compiler includes a technique for substituting equivalent instructions in the binary output, and further wherein the method requires operation of at least, one additional physical component of computer hardware architecture or microarchitecture which is absolutely and unequivocally essential and required to specifically perform the technique for substituting equivalent instructions in the binary output.

Yet another aspect of the invention provides a method of protecting against attacks by malware and computer viruses, comprising compiling a source program with a compiler, such that object code that is generated by the compiler for each file in the source program compares scrambled binary output, further wherein the compiler comprises a component for generating the object code for each file in the source program, and a binary scrambling component for generating the scrambled binary output, and further wherein the compiler includes a technique for randomizing register allocation.

Yet another aspect of the invention provides a method of protecting against attacks by malware and computer viruses, comprising compiling a source program with a compiler, such that object code that is generated by the compiler for each file in the source program comprises scrambled binary output, further wherein the compiler comprises a component for generating the object code for each file in the source program, and a binary scrambling component for generating the scrambled binary output, and further wherein the compiler includes a technique for randomizing function layout in the binary output. Additional aspects of the invention will become apparent in view of the following description and associated figures.

Figure 1:
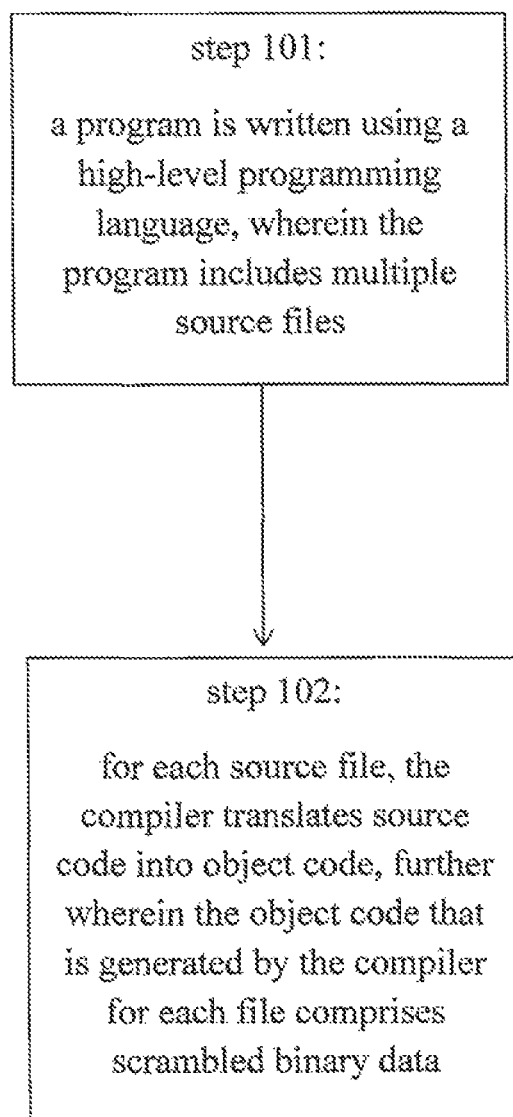
FIG. 1 illustrates a representative flowchart that depicts an overall process in accordance with the present invention, utilizing a compiler according to one non-limiting embodiment of the present invention.

Still other objects and advantages of preferred embodiments of the present invention will become readily apparent to those skilled in this art from the following detailed description, wherein there is described certain preferred embodiments of the invention, and examples for illustrative purposes.

DESCRIPTION OF PREFERRED EMBODIMENTS

Although the detailed description herein contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention. While embodiments are described in connection with the drawings and related descriptions, these is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

As used herein, the phrases "in one embodiments," "in various embodiments," "in some embodiments," and the like are used repeatedly. Such phrases do not necessarily refer to the same embodiment. The terms "comprising," "having," and "including" are synonymous, unless the context dictates otherwise.

Unless defined otherwise, all technical and scientific terms used herein have the same meaning as commonly understood by one of ordinary skill in the art.

As used herein, in accordance with the present invention, the term "compiler" is understood to refer to any program that translates each separate source file into an "object" file, and thereby translates source code into object code, which can then be combined to form machine executable files (commonly known as applications or application binaries). In this invention, the object code and resulting application binaries are scrambled from the original, unmodified form that, would occur without this invention.

As used herein, the term "source file" is understood to refer to any file that contains program instructions or source code, and which can be written using any high-Level programming language. A "source program" is intended to refer to any computer program or software program and can include multiple source files. By way of non-limiting example, examples of high-level programming languages include, but are not limited to, C, C++, Pascal, Perl, Cobol, Java, and Python.

In accordance with the present invention, high-level programming language can be used to write the source program or software, and the high-level programming language has no relation with any specific computer hardware.

It should be appreciated that the present invention can be implemented in numerous ways, including as a process, an apparatus, a system, a device, a method, or a computer readable medium. Several inventive embodiments of the present, invention are described below.

In a preferred embodiment, a method of protecting against attacks by mat ware and computer viruses is provided, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, further wherein the method is implemented in one or more of an apparatus, a system, a device, a computer, a database, or a computer readable medium.

The present invention can be implemented using any type of compiler and any type of computer hardware system, network system, or other platform. Several representative compilers are described herein. As used herein, the term "computer hardware system" is intended to include all the necessary components of a computer system that are required to "run" or execute a source program, and that allow someone to use the computer. By way of non-limiting example, the hardware components include, but are not limited to, a power supply, motherboard, hard disk, graphics card. Random, access memory (RAM), and other hardware components. Additional hardware components can include, for instance, a keyboard, mouse, speakers, etc.

It is contemplated that the methods of the present invention can therefore be implemented by operation of any type of computer system that includes computer components including but not limited to a processor, memory storage devices for the processor, connected display devices and input devices. Furthermore, the methods of the present invention can also be implemented by operation of computer components in a heterogeneous distributed computing environment, including for example one or more remote file servers, computer servers, and/or memory storage devices. Each of these distributed computing components is accessible by the processor via a communication network, which may include, but is not limited to, the Internet.

As used herein, the term "scramble" is intended to include any procedure, method or process that produces, at the level of the compiler, randomized binary output for each file. "Scrambled binary data" thus includes, but is not limited to, any form of binary data that is reorganized or reconfigured in a random manner such that the original functionality is either still preserved or could be restored.

As used herein, the term "binary scrambling" is intended to include any method, procedure, or process that can be utilized, performed or implemented to scramble binary output data at the level of a compiler.

In at least one non-limiting embodiment, the present invention provides a method of scrambling binary data for each file at the level of the compiler.

According to another embodiment, the present invention provides a method of scrambling binary data for each of a plurality of source files at the level of the compiler, further wherein each of the source files can be written in any programming language.

By way of non-limiting example, when compiling one or more source files, the binary data for each file is scrambled at the level of the compiler.

By way of non-limiting example, a combination of scrambling algorithms are used to perform binary scrambling, and thus to scramble the binary data for each separate for that is compiled.

By way of non-limiting example, according to the present invention, when a source file is compiled, the compiler will compile the source for in such a manner that the object code has a randomized binary form, i.e., the object code that is generated by the compiler for each file comprises scrambled binary data.

The present invention can be milked with any type of compiler that translates source code into object code.

Referring to FIG. 1, at step 101, a program is written using a high-level programming language, wherein the program includes multiple source files. At step 102, for each source file, the compiler translates source code into object code, further wherein the object code that is generated by the compiler for each file comprises scrambled binary data.

Figure 2:
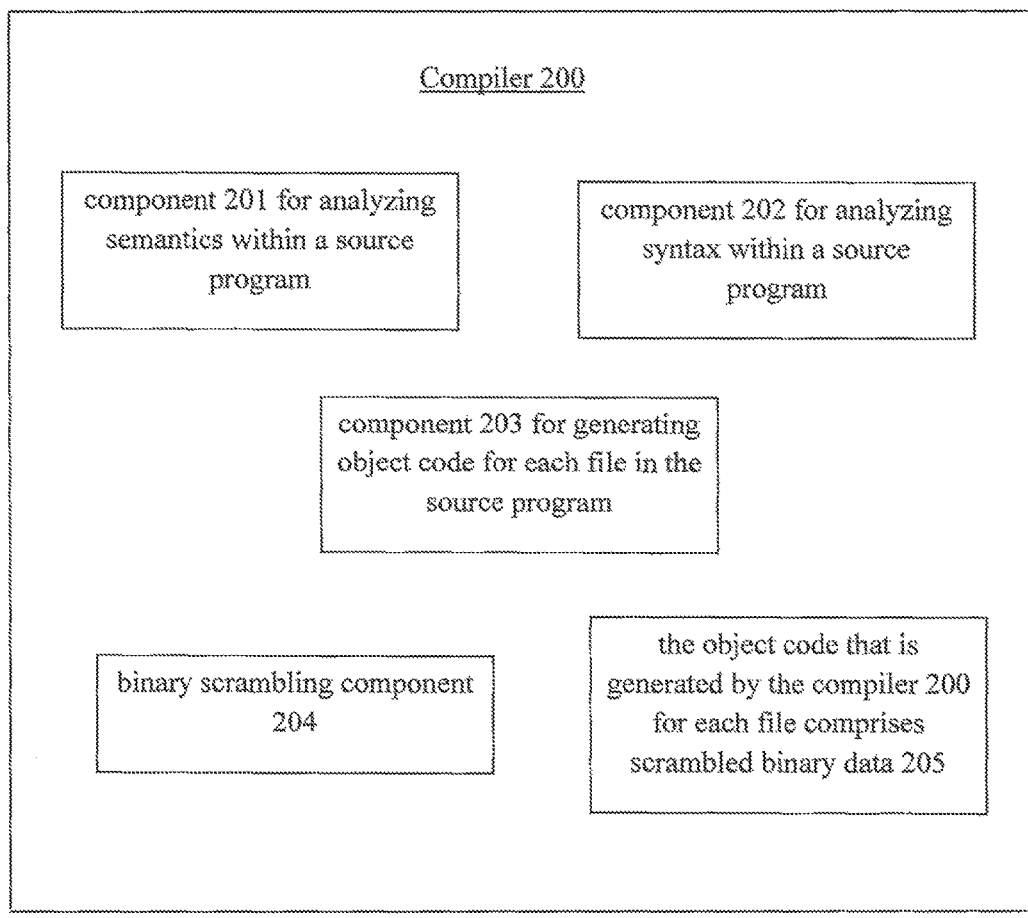
FIG. 2 is a block-diagram depiction of a compiler according to one non-limiting embodiment of the present invention, wherein the compiler includes components for analyzing semantics and syntax, for generating object code for each the in the source program, and a binary scrambling component, further wherein the object code that is generated by the compiler for each file comprises scrambled binary data.

FIG. 2 is a block-diagram depiction of a representative compiler 200 according to one non-limiting embodiment of the present invention. The compiler 200 includes component 201 for analyzing semantics within a source program; component 202 for analyzing syntax within a source program; component 203 for generating object code for each file in the source program, and a binary scrambling component 204, wherein the object code that is generated by the compiler 200 for each file comprises scrambled binary data 205.

In accordance with a preferred embodiment of the present invention, a compiler comprises a front end and a backend in which the backend is more dependent on the architectural framework of the system. Preferably, the front end comprises a Lexical Analyzer, Syntax Analyzer and Semantic Analyzer. The Lexical Analyzer isolates each pan of a statement and tokenizes each part as operands, operator, variable, constants etc. The lexical analysts phase reads the characters in the program and groups them into tokens that are sequence of characters having a collective meaning. The Syntax Analyzer parses the token sequence and identifies the syntactic structure of the program. The Semantic Analyzer cheeks for type errors and adds all the necessary semantic information to the parse tree.

Figure 3:
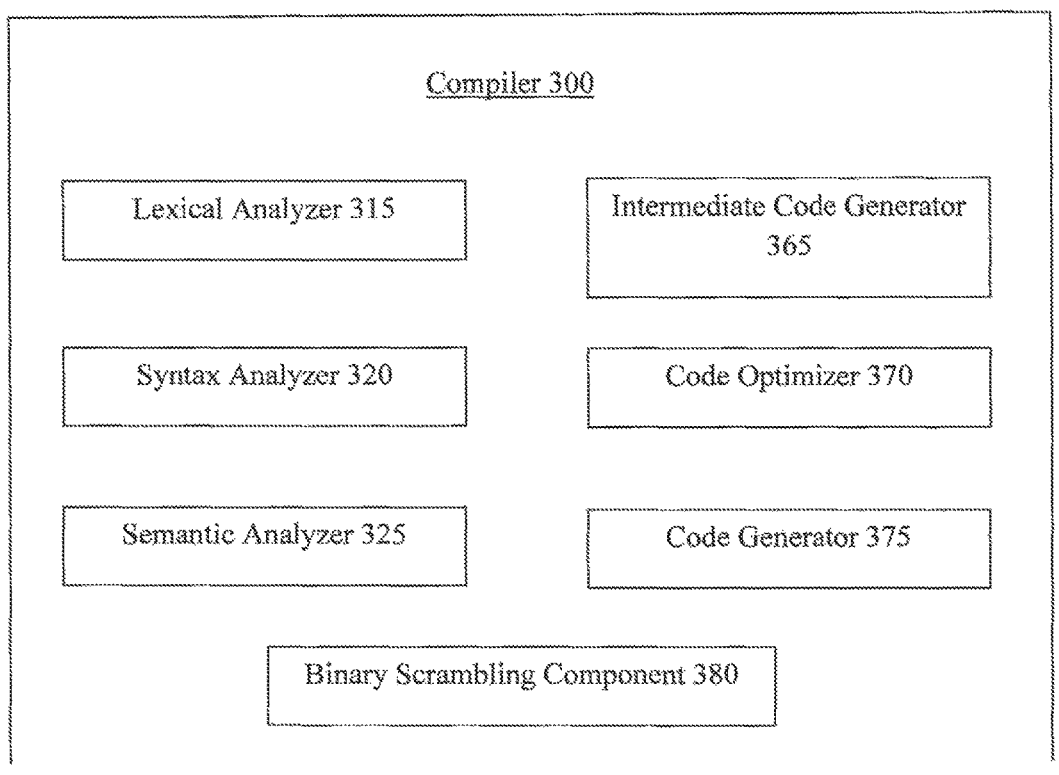
FIG. 3 depicts one preferred embodiment of a compiler according to the present invention.

FIG. 3 depicts fine such preferred embodiment of a compiler according to the present invention, in which a representative compiler 300 composes a front, end and a backend. The front end of the compiler 300 comprises a Lexical Analyzer 315, Syntax Analyzer 320 for analyzing syntax within a source program, and Semantic Analyzer 325 for analyzing semantics within a source program. The backend of the compiler 300 comprises an Intermediate Code Generator 365, Code Optimizer 370 and Code Generator 375 for generating object code for each file in the source program. The representative compiler 300 further includes a binary scrambling component 380, wherein the object code that is generated by the compiler 300 for each file comprises scrambled binary data.

Referring again to FIG. 3, with regard to the Intermediate Code Generator 365, this phase of the compiler transforms parser tree into an intermediate language representation of the source program. Intermediate codes are machine independent codes, but they are close to machine instructions. With regard to the Code Optimizer 370, Code optimization is utilized in order to modify the working code to a more optimal code. In accordance with the present invention, the code optimization phase improves the intermediate code, so that faster running machine code will result. The Code Generator 375 takes the optimized intermediate representation of the source program as input and then produces a target program or object program as its output. The final phase of the compiler is the generation of the target code or machine code or assembly code. Memory locations are selected for each of the variables used by the program. Intermediate instructions are then translated into a sequence of machine instructions that perform the same task. The back end performs the intermediate code generation, code optimization and generation which are very significant parts in the compilation process, wherein the object code that is generated by the compiler 300 for each file comprises scrambled binary data.

By way of non-limiting example, the present invention can be used with any type of compiler, for instance a C++ compiler. When a C++ compiler reads a source file (an input file) and translates the source file into a binary data file containing its results (the object file), the C++ source code is thus compiled into binary code. In accordance with the present invention, the object code is in scrambled binary data format.

By way of non-limiting example, when compiling C++ source code from each of a number of different C++ programming language source files, one could type the command:

gcc file.cpp where 'file' is replaced by the name of each of the different C++ files. In accordance with the present invention, each C++ class file that is produced by the C++ compiler of the present invention has machine instructions in scrambled binary output format. The output, file can be executed on a computer as it normally would.

The scrambled transformations are of arbitrary complexity, and will vary by specific programming language and instruction set of the target computer. According to a preferred embodiment of the invention, the scrambled transformations include, but are not limited to, one or more of the following transformations;

1. Register reallocation, and specifically substituting equivalent hardware registers where possible. For example, on x86 based CPU chips, register eax may be used interchangeably with register ebx.
2. Reordering of functions. Traditionally, functions are laid out in a binary file in source code order. In this invention, the layout order is randomized.
3. Loop unrolling randomness. Loop unrolling is a well known technique to avoid branching and optimize certain instruction, set sequences. For example, instead of a loop to count five items, the five items can be counted sequentially. In this invention, the limit for loop unrolling should be changed, and similarly, partial unrolling can be performed.
4. Introduction of no-ops and other obfuscation code. Dummy code, or chaff, should be inserted in various locations around the binary to create additional entropy. When chaff code is inserted into reachable areas (i.e. the code could be executed), care should be taken to ensure that it is a no-op—e.g. adding 100 and then subtracting 100 afterwards. Arbitrary code may be inserted in unreachable areas of a binary.
5. Substitution of alternative instructions to perform semantically equivalent operations. For example, multiplication of X by 2 can be substituted with an addition of X+X.
6. Changing the order of evaluation of expressions where it is legal to do so (e.g. commutative operations)
7. Modification and randomization of import tables and other lookup tables. Traditionally these tables are either in source code order or alphabetical; the layout should instead be randomized.

The net result of performing all of these modifications is to introduce a significant level of entropy into the resulting binaries, while preserving the semantic functionality and performance of the binary. The probability of a 10 gadget ROP chain virus successfully working on a twenty megabyte binary scrambled in such a fashion is approximately 8×10-15, 8 in a quadrillion. Smaller or larger binaries will have smaller and larger entropy of course. The cybersecurity benefit however is the same, cyberattackers will have to engineer different malware to attack the scrambled binary.

Historical attempts at binary diversity have failed to produce such entropy. The ASLR (address space layout randomization) technique used by Microsoft Windows, Linux, and other operating systems for example has one degree of entropy. Simply knowing a single number—a single address—is enough to defeat that technique. Similarly, techniques with 16 bits of entropy or less can be defeated easily through brute force techniques of simply guessing every possible combination.

Figure 4:
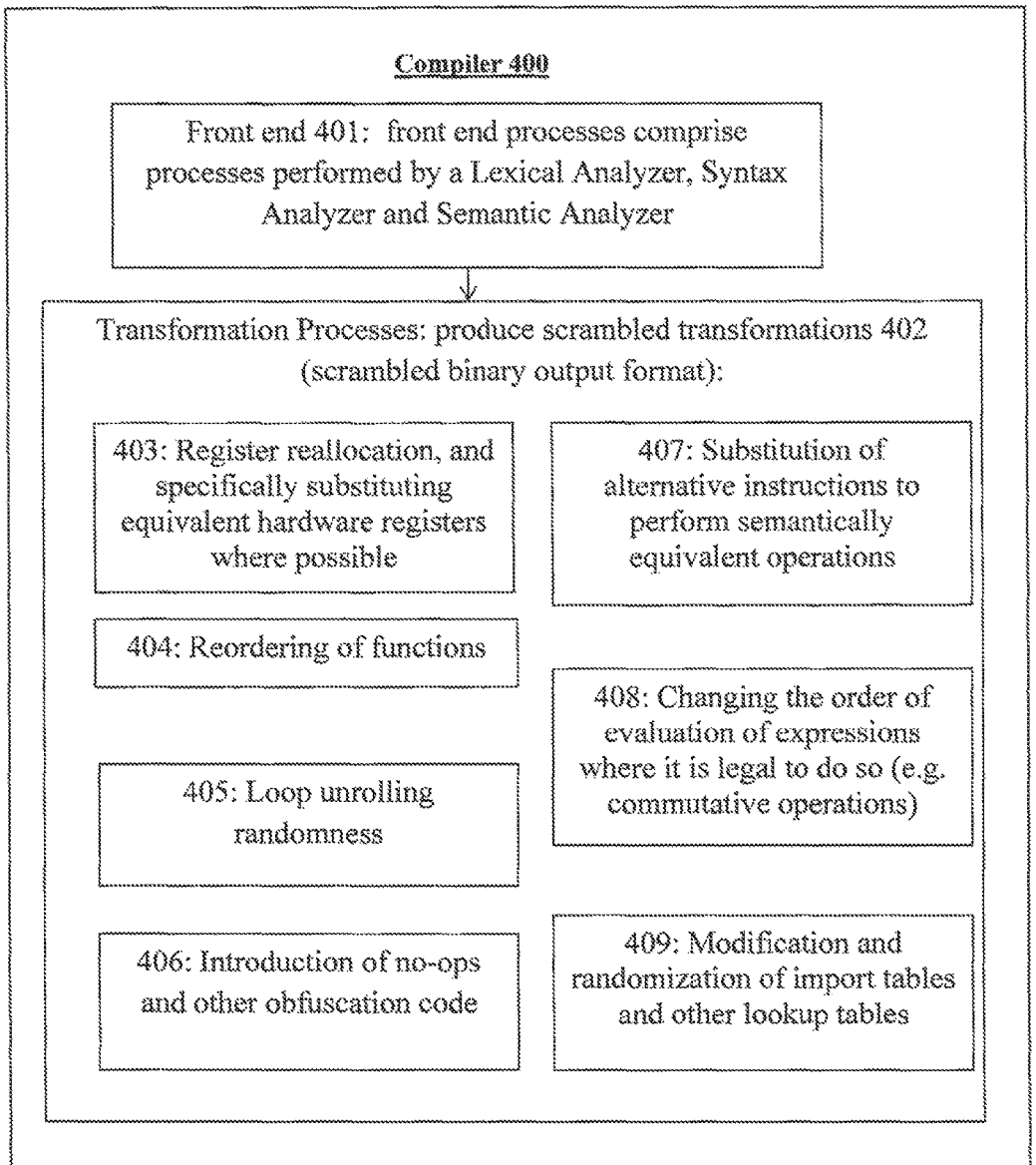
FIG. 4 depicts another example of a compiler that can be used in accordance with the present invention.

Another example of a compiler that can be used in accordance with the present invention is shown in FIG. 4. A compiler 400 is shown that depicts a front end 401, wherein examples of front end processes include, but are not limited to, processes performed by a Lexical Analyzer, Syntax Analyzer and Semantic Analyzer. The backend of the compiler 400 comprises, for example, an Intermediate Code Generator, Code Optimizer and Code Generator for generating object code for each file in the source program, wherein the object code that is generated by the compiler 400 for each file comprises scrambled binary data. Referring again to FIG. 4, the scrambled transformations 402 include, but, are not limited to, one or more transformations such as the following (1) Register reallocation, and specifically substituting equivalent hardware registers where possible (403); (2) Reordering of functions (404); (3) Loop unrolling randomness (405); (4) introduction of no-ops and other obfuscation code (406); (5) Substitution of alternative instructions to perform semantically equivalent operations (407); (6) Changing the order of evaluation of expressions where it is legal to do so (e.g. commutative operations) (408); and (7) Modification and randomization of import tables and other lookup tables (409).

In accordance with the present invention, any type of scrambled code can be introduced, and any type of software program can be scrambled or obfuscated, including, for example, binary program images; byte-code images such as Java™ class files; intermediate code forms produced by compilers; executable files; assembly language programs; source code representations; and various other program representations.

In other embodiments of the invention, one or more other types of scrambled transformations or obfuscation transformations can be performed in accordance with the present invention, such that object code that is generated by the compiler for each file in the source program comprises scrambled binary output. One or more scrambled transformations or obfuscation transformations can be applied, for example, to the computer program's local structure, control graph, and/or data, structure in order to render the program more difficult to understand and/or modify. According to one example of a scrambled transformation, a binary code modification tool is linked with a program module containing code for performing a variety of scrambled transformations.

In other embodiments, scrambled transformations that can be used to generate scrambled binary data can include, for example, one or more transformations (a) that add complexity, (b) those that remove structure, (c) those that remove useful information, and (d) those that add disinformation. For instance, a scrambled transformation that adds complexity or removes structure will typically make both static and dynamic analysis of the program more difficult, and thus be useful for protecting against attacks by malware and computer viruses. Similarly, the removal of useful information, such as symbol tables, leaves the attacker with less to work from; while the addition of disinformation, such as misleading symbol tables, can cause an attacker to make incorrect assumptions.

Scrambled transformations are applied automatically, wherein a physical, tangible, non-abstract computer hardware system as described further herein is essential and required for carrying out physical, non-abstract, computerized operations for the automatic application of scrambled transformations, in accordance with the principles of the present invention. The automatic application of scrambled transformations is utilized, wherein a physical, tangible, non-abstract computer hardware system as described further herein is essential and required for carrying out physical, non-abstract computerized operations for the automatic application of scrambled transformations, because in most instances such transformations should be applied pervasively and repeatedly to increase their effectiveness.

Preferred methods of the present invention, for protecting against attacks by malware and computer viruses, comprise compiling a source program with a compiler, such that object code that is generated by the compiler for each file in the source program comprises scrambled binary output. The methods of the present invention also allow one to achieve the desired speed of the compiled code (e.g., fast compilation) and interoperability among languages.

According to other certain embodiments of the invention, a process of compiling a source program with a compiler may also include one or more code optimization processes, such that the object code that is generated by the compiler for each file comprises scrambled binary data. Such code optimization processes may include, processes of modifying the working code to a more optimal code based on the goal of generating scrambled binary data. In preferred embodiments, code optimization processes can be performed to improve the intermediate code, to achieve the goal of generating scrambled binary data. Such code optimization processes cart include, for example, high-level optimizations (e.g., code optimization processes which are performed on the source with output fed to later optimization passes); local optimizations for optimizing code; global optimizations; and processor-dependent optimizations which take advantage of specific knowledge of the computer architecture or microarchitecture.

As described herein, the present invention can be implemented using any type of compiler and any type of computer hardware system, network system, or other platform. The compiler is used such that the high level executions that, are made in a programming language are compiled and implemented by the underlying hardware computer architecture.

According to the present invention, arty type of effective compiler can be used which allows for efficient execution of application programs for a given computer architecture, and preferred architectural features can be utilized to support more effective compiler optimization techniques.

Figure 5:
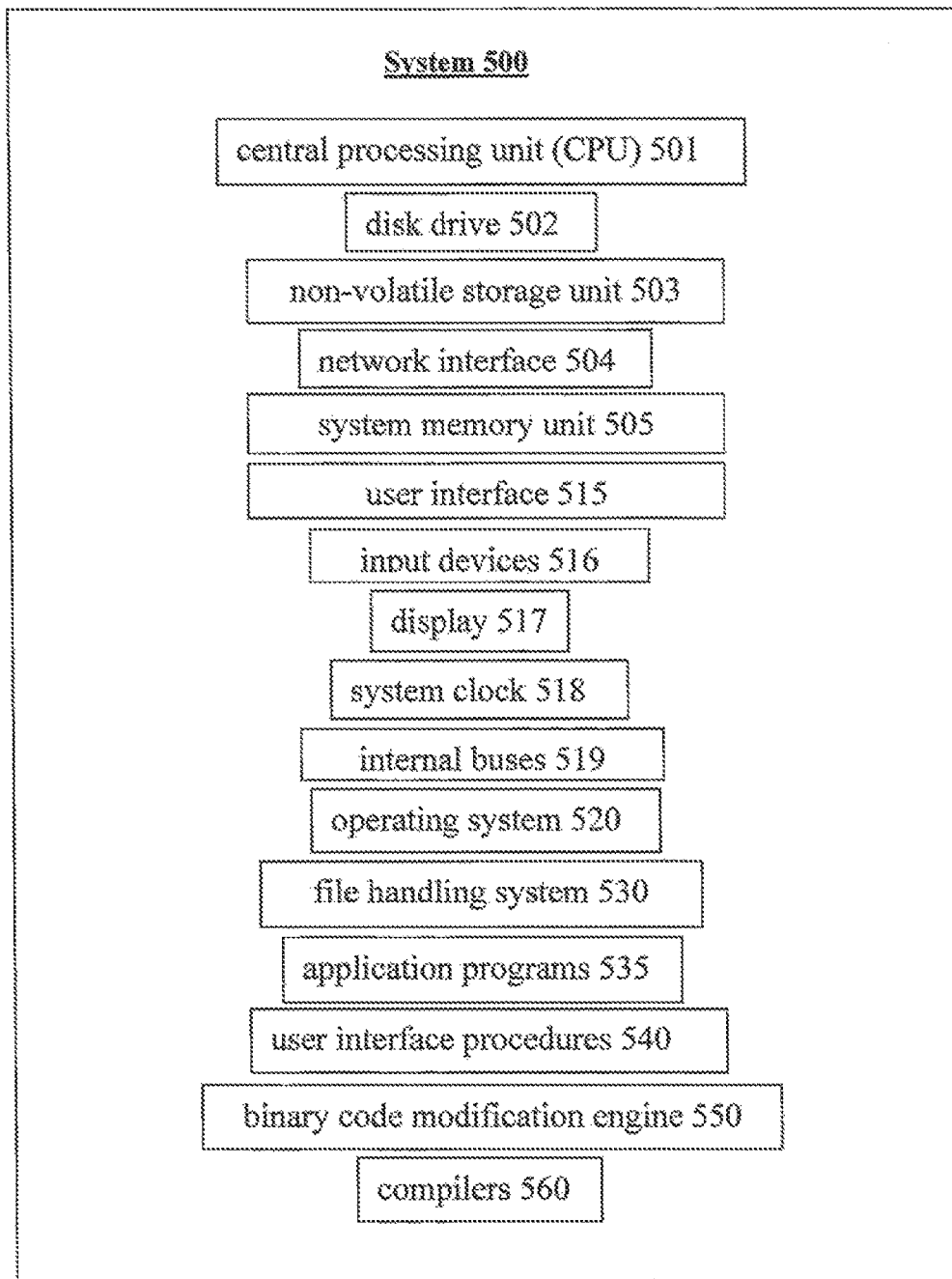
FIG. 5 depicts a representative system that can be used in accordance with the present invention.

As described herein, the present invention can be implemented using any type of compiler and any type of computer hardware system, network system, or other platform. A representative system, such as a workstation or personal computer, can be used for practicing the present invention. As shown in FIG. 5, a representative system 500 that can be used in accordance with the invention includes one or more of the following: a central processing unit (CPU) 501; an optical and/or magnetic disk drive 502 for reading from and/or writing to CDs, diskettes, or other storage media; a non-volatile storage unit 503, such as a hard disk drive, for storing data and program files; a network interface 504 for connecting computer system 500 to a network such as the Internet; a system memory unit 505, preferably including both high-speed read only memory (ROM) and random access memory (RAM), for storing, e.g., data, system control, programs, and application programs loaded from disk drive 502, storage unit 503, and/or network interface 504, such programs including programs incorporating computer code that embodies or implements aspects of the present, invention; a user interface 515, including one or more input devices 516 and a display 517; a system clock 518; and one or more infernal buses 519 for interconnecting the elements of the system 500. The operation of the system 500 is preferably controlled primarily by programs stored in system memory (e.g., RAM) and executed by CPU 501. These programs could include an operating system 520; a file handling system 530; one or more application programs 535; a set of user interface procedures 540; a binary code modification engine 550 for modifying and/or rearranging binary code and for applying scrambling transformations and obfuscation transformations; and one or more compilers 560 as described herein, wherein one or more compilers 560 comprise a component for generating object code for each file in the source program, and a binary scrambling component for generating the scrambled binary output, it should be appreciated that while FIG. 5 sets forth an exemplary system for practicing embodiments of the present invention, other systems with different architectures and different configurations of subsystems could also be used, for example, embodiments of the present invention can be practiced using only a limited subset of the components shown in FIG. 5. Accordingly, it should be understood that the system shown in FIG. 5 is intended to be illustrative and not limiting.

To achieve desired compiler optimization, the specific computer architecture or microarchitecture can be selected as desired. For example, the number of registers can be increased to make it easier for the compiler to allocate registers.

One embodiment of tire present invention provides a method and a compiler for compiling a source program, such that the object code that is generated by the compiler for each file in the source program comprises scrambled binary output.

Another embodiment, of the invention provides a method of protecting against attacks by malware and computer viruses, comprising compiling a source program with a compiler, such that object code that is generated by the compiler for each file in the source program comprises scrambled binary data.

Another embodiment of the invention provides a method of compiling a source program, comprising compiling each file in the source program with a compiler, and scrambling the binary output for each file that is compiled.

Yet another embodiment of she invention provides a method of protecting against attacks by malware and computer viruses, comprising compiling a source program with a compiler, such that object, code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output.

Yet another embodiment of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each for in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing register allocation, and further wherein the method requires operation of at least one additional physical component of computer hardware architecture or microarchitecture which is absolutely and unequivocally essential and required to specifically perform the technique for randomizing register allocation.

Yet another embodiment of the invention provides a method of protecting against attacks by malware and computer viruses, comprising compiling a source program with a compiler, such that object code that is generated by the compiler for each file in the source program comprises scrambled binary output wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential, and required for generating the scrambled binary output, and further wherein the compiler includes a technique for randomizing function layout in the binary output, and further wherein the method requires operation of at least one additional physical component of computer hardware architecture or microarchitecture which is absolutely and unequivocally essential and required to specifically perform the technique for randomizing function layout in the binary output.

Yet another embodiment of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of compute hardware architecture or microarchitecture which is absolutely and unequivocally essential and required for generating the scrambled binary output, and further wherein the compiler includes a technique for randomizing loop unrolling in the binary output, and further wherein the method requires operation of at least one additional physical component of computer hardware architecture or microarchitecture which is absolutely and unequivocally essential and required to specifically perform the technique for randomizing loop unrolling in the binary output.

Yet another embodiment of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and a binary scrambling component for generating the scrambled binary output, and further wherein the method requires operation of at least one physical component of compute hardware architecture or microarchitecture which is absolutely and unequivocally essential and required for generating the scrambled binary output, and further wherein the compiler includes a technique for randomizing import tables in the binary output, and further wherein the method requires operation of at least one additional physical component of computer hardware architecture or microarchitecture which is absolutely and unequivocally essential and required to specifically perform, the technique for randomizing import tables in the binary output.

Yet another embodiment of the invention provides a method of protecting against attacks by malware and computer viruses, comprising compiling a source program with a compiler, such that object code that is generated by the compiler for each file in the source program comprises scrambled binary output, wherein the compiler comprises a component for generating the object code for each file in the source program, and, a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for introducing chaff code in the binary output, and further wherein the method requires operation of at least one additional physical component of computer hardware architecture or microarchitecture which is absolutely and unequivocally essential and requited to specifically perform the technique for introducing chaff code in the binary output.

Yet another embodiment of the invention provides a method of protecting against attacks by malware and computer viruses, comprising compiling a source program with a compiler, such that object code that is generated by the compiler for each, file in the source program comprises scrambled binary output, wherein, the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating, the scrambled binary output, and further wherein the compiler includes a technique for substituting equivalent instructions in the binary output, and further wherein the method requires operation of at least one additional physical component of computer hardware architecture or microarchitecture which is absolutely and unequivocally essential and required to specifically perform the technique for substituting equivalent instructions in the binary output.

Yet another embodiment of the invention provides a method of protecting against attacks by malware and computer viruses, comprising compiling a source program with a compiler, such that object code that, is generated by the compiler for each file in the source program comprises scrambled binary output, further wherein the compiler comprises a component for generating the object code for each file in the source program, and a binary scrambling component for generating the scrambled binary output, and further wherein the compiler includes a technique for randomizing register allocation.

Yet another embodiment of the invention provides a method of protecting against attacks by malware and computer viruses, comprising compiling a source program with a compiler, such that object code that is generated by the compiler for each file in the source program comprises scrambled binary output further wherein the compiler comprises a component for generating the object code for each file in the source program, and a binary scrambling component for generating the scrambled binary output, and further wherein the compiler includes a technique for randomizing function layout in the binary output.

In one non-limiting example, a C++ program is written for visually rendering an image on a screen, for instance, an image of a tree. In this example, each of the C++ source files has source code that is used for visually rendering a different part of the tree (including branches, leaves, etc). Continuing with this non-limiting example, as described herein, each object file that is produced by the C++ compiler of the present invention has machine instructions scrambled in the manner described above. Thus, each resulting image (i.e., each separate image of a tree that is visualized on the screen) will have a unique compilation of binary object files, since each C++ source file that is used to render the overall image has object code that has been intentionally scrambled or randomized.

When the compiler of the present invention translates source code into object code, the compiler can also analyze for correct syntax and also for any semantic errors. When compiling a source program, error handling can also be performed, wherein one or more errors of the source program can be detected when compiling the source program. If an error is discovered, for example an error in the spelling of a word processing can be performed to correct the error, and the compiler can continue until the source code for every source file in the source program is translated into object code.

Prevention and Disabling of Unwanted Effects of Malware and Other Malicious Code By way of non-limiting example, the methods and systems of the present invention are very effective in reducing, disabling and or eliminating the unwanted effects of viruses, malware and other malicious code.

With conventional compilers, the object files comprising object code are linked together to form an executable file. In many instances, when these conventional complies are utilized, a computer virus or malware will spread or "infect" another host computer when the executable code is shared with an infected source.

Unlike conventional approaches that utilize only conventional compilers, the present invention provides a method and a compiler for compiling source program such that the object code that is generated by the compiler for each file comprises scrambled binary output. The present invention thus provides security for a computer system and protection against attacks by malware and computer viruses, since the object code that is generated by the compiler for each file comprises scrambled output. Because the object code for each file comprises scrambled binary data, the target program is not vulnerable to attack, and the malware will not spread or "infect" another host computer. The present invention also provides security against "Zero Day Malware" which, under conventional circumstances, typically would not allow any significant amount of time to defend against an attack.

A Representative Preferred Embodiment of the Invention

According to one representative preferred embodiment, the present invention comprises the following:

A physical, tangible, non-abstract computer hardware system that is essential and required for implementing the methods of the present invention and for carrying out physical, non-abstract computerized operations that are required and necessary for scrambling binary data for each of a plurality of source files at the level of a compiler;

further wherein the binary data for each file is scrambled at the level of the compiler, further wherein the physical, tangible, non-abstract computer hardware system is essential and required for implementing one or more scrambling algorithms that are operable for performing binary scrambling, and to scramble the binary data for each separate file that is compiled;

further wherein the system is required and operable such that when a source file is compiled, the compiler is operable for compiling the source file in such a manner that the object code has a randomized binary form, such that the object code that is generated by the compiler for each file comprises scrambled binary data;

further wherein the physical, tangible, non-abstract computer hardware system is essential and required for implementing physical, non-abstract computerized operations for protecting against attacks by malware and computer viruses, wherein said physical, non-abstract computerized operations that are performed by said physical, tangible, non-abstract computer hardware system comprise compiling a source program with a compiler, such that object code that, is generated by the compiler for each file in the source program comprises scrambled binary output, wherein the compiler comprises a component for generating the object code for each the in the source program, and a binary scrambling component for generating the scrambled binary output;

further wherein said physical, non-abstract computerized operations that are performed by said physical tangible, non-abstract computer hardware system are implemented in one or more of a physical, tangible, non-abstract apparatus, system, device, computer, database, and computer readable medium;

further wherein the source program comprises any computer program of software program and comprises multiple source files;

further wherein the physical, tangible, non-abstract composer hardware system that is essential and required for carrying out said physical, non-abstract computerized operations comprises one or more components of a computer system that are required to nut or execute a source program, and that allow someone to use a computer, and further wherein said computer hardware system that is essential and required for carrying out said physical, non-abstract computerized operations comprises a plurality of physical, tangible, non-abstract hardware components comprising one or more of a power supply, motherboard, hard disk, graphics card, and random access memory;

further wherein said physical, non-abstract computerized operations are implemented by the physical, tangible, non-abstract computer hardware system, wherein the computer hardware system further comprises one or more physical, non-abstract processors and one or more physical, non-abstract memory storage devices for the one or more physical, non-abstract processors;

further wherein said physical, non-abstract computerized operations are implemented by the physical, tangible computer hardware system in a physical, non-abstract heterogeneous distributed computing environment, wherein said physical, non-abstract heterogeneous distributed computing environment comprises one or more physical, non-abstract remote file servers, one or more physical, non-abstract computer servers, and/or one or more physical, non-abstract memory storage devices, and further wherein each of these distributed computing components is accessible by the processor via a physical, non-abstract communication network;

further wherein said scrambled binary data comprises any form of binary data that is reorganized or reconfigured in a random manner such that the original functionality is either still preserved or could be restored;

further wherein the compiler comprises one or more components for analyzing semantics within a source program, one or more components for analyzing syntax within a source program, one or more components for generating object code for each file in the source program, and one or more binary scrambling components, further wherein, the object code that is generated by the computer for each file comprises scrambled binary data;

further wherein the compiler comprises a front end and a backend, and further wherein the backend is dependent on the architectural framework of the system;

further wherein the front end comprises one or more lexical analyzers, syntax analyzers and semantic analyzers;

further wherein the one or more lexical analyzers isolate each part of a statement and tokenize each part as operands, operator, variable, and constants;

further wherein the lexical analysis phase reads the characters in the program and groups them into tokens that are sequence of character having a collective meaning;

further wherein the one or more syntax analyzers parse the token sequence and identifies the syntactic structure of the program;

further wherein the one or more semantic analyzers are operable for checking for type errors and adding necessary semantic information to the parse tree;

further wherein the backend of the compiler comprises an intermediate code generator, a code optimizer and a code generator for generating object code for each file in the source program;

further wherein the compiler further includes a binary scrambling component, wherein the object code that is generated by the compiler for each file comprises scrambled binary data;

further wherein, with regard to the intermediate code generator, this phase of the compiler transforms parser tree into an intermediate language representation, of the source program;

further wherein, with regard to the code optimizer, code optimization is utilized in order to modify the working code to a more optimal code, wherein the code optimization phase improves the Intermediate code, so that taster running machine code will result;

further wherein the code generator takes the optimized intermediate representation of the source program as input and then produces a target program or object program as its output, and further wherein the final phase of the compiler is the generation of the target code or machine code or assembly code; further wherein memory locations are selected for each of the variables used by the program, and further wherein intermediate instructions are then translated into a sequence of machine instructions that perform the same task, and further wherein the back end performs the intermediate code generation, code optimization and generation for the compilation process, and further wherein the object code that is generated by the compiler for each file comprises scrambled binary data;

further wherein the compiler reads a source file and translates the source file into a binary data file containing its results (the object file), and the source code is thus compiled into binary code, and the object code is in scrambled binary data format; and further wherein each class file that is produced by the compiler has machine instructions in scrambled binary output format; and further wherein the output file can be executed on a computer as it normally would;

further wherein the compiler comprises a component for generating the object code for each file in the source program, and a binary scrambling component for generating the scrambled binary output, and further wherein the system requires operation of at least one physical component of computer hardware architecture or microarchitecture which is absolutely and unequivocally essential and required for generating the scrambled binary output;

further wherein the system requires operation of at least one physical component of computer hardware architecture or microarchitecture which is absolutely and unequivocally essential and required to specifically perform computer operations for randomizing register allocation, further wherein the register reallocation comprises substituting equivalent hardware registers, and further wherein on x86 based CPU chips, register eax is used interchangeably with register ebx;

further wherein the system requires operation of at least one physical component of computer hardware architecture, or microarchitecture which is absolutely and unequivocally essential and required, to specifically perform computer operations for reordering of functions;

further wherein the system requires operation of at least one additional physical component of computer hardware architecture or microarchitecture which is absolutely and unequivocally essential and required to specifically perform computer operations for randomizing function layout in the binary output, wherein the layout order is randomized;

further wherein the system requires operation of at least one additional physical component of computer hardware architecture or microarchitecture which is absolutely and unequivocally essential and required to specifically perform computer operations for randomizing loop unrolling in the binary output, wherein the at least one additional physical component of computer hardware architecture or microarchitecture is operable for implementing loop unrolling randomness, wherein the loop unrolling is operable to avoid branching and optimize instruction set sequences, further wherein the limit for loop unrolling is changed and fun her wherein partial unrolling is performed;

further wherein the system requires operation of at least one additional physical component of computer hardware architecture or microarchitecture which is absolutely and unequivocally essential and required to perform computer operations for modification and randomization of one or more import tables and one or more lookup tables in the binary output;

further wherein the system requires operation of at least one additional physical component of computer hardware architecture or microarchitecture which is absolutely and unequivocally essential and required to specifically perform computer operations for introducing chaff code in the binary output, and for introduction of no-ops and other obfuscation code, further wherein dummy code or chaff is inserted in various locations around the binary to create additional entropy, further when chaff code is inserted into reachable areas, computer operations are implemented to ensure that it is a no-op, by performing steps to add a specific number and then subtract the same specific number afterwards, and further wherein computer operations are implemented to ensure that arbitrary code is inserted in unreachable areas of a binary;

further wherein the system requires operation of at least one additional physical component of computer hardware architecture or microarchitecture which is absolutely and unequivocally essential and required to specifically perform computer operations for substituting equivalent instructions in the binary output, comprising substitution of alternative instructions to perform semantically equivalent operations, further wherein instructions to perform multiplication of a specific variable by a designated number is substituted with instructions to perform an addition of the same specific variable and an identical specific variable;

further wherein the system requires operation of at least one additional physical, component of computer hardware architecture or microarchitecture which is absolutely and unequivocally essential and required to specifically perform computer operations for changing the order of evaluation of expressions where it is legal to do so, further wherein said computer operations for changing the order of evaluation of expressions where it is legal to do so comprises computer operations for performing one or more commutative operations;

further wherein the physical, tangible, non-abstract computer hardware system, wherein said system is essential and required for carrying out physical, non-abstract computerized operations that are necessary for scrambling binary data for each of a plurality of source files at the level of a compiler, is operable for the introduction of a significant level of entropy into the resulting binaries, while preserving semantic functionality and performance of the binary;

further wherein the physical, tangible, non-abstract computer hardware system, wherein said system is essential and required for carrying out physical, non-abstract computerized operations that are necessary for scrambling binary data for each of a plurality of source files at the level of a compiler, is operable such that the probability of a 10 gadget ROP chain virus successfully working on a twenty megabyte binary scrambled in such a fashion is approximately $8 \times 10^{-15}$, 8 in a quadrillion;

further wherein the physical tangible, non-abstract computer hardware system, wherein said system is essential and required for carrying out physical, non-abstract computerized operations that, are necessary for scrambling binary data for each of a plurality of source files at the level of a compiler, is operable such that any type of scrambled code can be introduced, and any type of software program can be scrambled or obfuscated, comprising one or more of binary program images, byte-code images, Java™ class files, intermediate code forms produced by compilers, executable files, assembly language programs, and source code representations;

further wherein the physical tangible, non-abstract computer hardware system is essential and required for carrying out physical, non-abstract computerized operations such that one or more scrambled transformations or obfuscation transformations are applied to one or more of the computer program's local structure, control graph, and/or data structure in order to render the program more difficult to understand and modify;

further wherein at least one binary code modification tool is linked with a program module containing code for peaforming a variety of scrambled transformations;

further wherein the physical, tangible, non-abstract computer hardware system is essential and required for carrying out physical, non-abstract computerized operations such that a plurality of other scrambled transformations are performed to generate scrambled binary data, comprising scrambled transformations that add complexity to the binary data, scrambled transformations that remove structure from the binary data, scrambled transformations that remove useful information from the binary data, and scrambled transformations that add disinformation to the binary data;

further wherein the scrambled transformations that add complexity to the binary data and the scrambled transformations that remove structure from the binary data, are operable to make both static and dynamic analysis of the program more difficult, and are operable for protecting against attacks by malware and computer viruses;

further wherein the removal of useful information comprises the removal of one or more symbol tables, and further wherein the addition of disinformation comprises the addition of one or more misleading symbol tables;

further wherein the physical, tangible, non-abstract computer hardware system, wherein the system is essential and required for carrying out physical, non-abstract computerized operations that, are necessary for scrambling binary data for each of a plurality of source files at the level of a compiler, is operable for performing a process of compiling a source program with a compiler comprising one or more code optimization processes, such that the object code that is generated by the compiler for each file comprises scrambled binary data, and further wherein said one or more code optimization processes comprise one or mom processes of modifying the working code to a mom optimal code, and further comprising one or more code optimization processes to improve the intermediate code, and further wherein said one or more code optimization processes comprise one or more code optimization processes which are performed on the source with output fed to later optimization passes, one or more local optimizations for optimizing code, one or more global optimizations, and one or more processor-dependent optimizations;

further wherein the physical tangible, non-abstract computer hardware system comprises one or more of a central processing unit, an optical and/or magnetic disk drive for reading from and/or writing to CDs, diskettes, or other storage media, a non-volatile storage unit for storing data and program files, a network interface for connecting the system to a network, a system memory unit comprising both high-speed read only memory (ROM) and random access memory (RAM) for storing data, system control programs, and application programs loaded from a disk drive, a storage unit, and a network interface, a user interface, comprising one or more input devices and a display, a system clock and one or more internal buses for interconnecting the elements of the system, and timber wherein the operation of the system is controlled primarily by programs stored in system memory and executed by CPU, and further wherein these programs comprise one or more of an operating system, a file handling system, and one or more application programs, a set of user interface procedures, a binary code modification engine for modifying and/or rearranging binary code and for applying scrambling transformations and obfuscation transformations, and one or more compilers, wherein the one or more compilers comprise one or more non-abstract components for generating object code for each file in the source program, and further comprising at least one binary scrambling component for generating the scrambled binary output;

further wherein the physical, tangible, non-abstract computer hardware system, wherein the system is essential and required for carrying out physical, non-abstract computerized operations that are necessary for scrambling binary data for each of a plurality of source files at the level of a compiler, is essential and required for providing security and protection against attacks by malware and computer viruses, wherein the object code that is generated by the compiler for each file comprises scrambled output, and further wherein the system provides further security against Zero Day Malware.

The foregoing descriptions of the embodiments of the present invention have been presented for purposes of illustration and description. They are not intended to be exhaustive of to limit the present invention to the precise forms disclosed. Although specific embodiments have been illustrated and described herein, a variety of alternate and or equivalent implementations may be substituted for the specific embodiment shown and described without departing front the scope of the present disclosure. This application is intended to cover any adaptations or variations of the embodiments discussed herein.

The invention claimed is:

1. A physical, non-abstract binary scrambling system comprising:
   a physical, non-abstract computer hardware system, wherein said hardware system is required for:
   (i) carrying out physical, non-abstract computerized operations for scrambling binary data for each of a plurality of source files at the level of a compiler,
      wherein the compiler comprises a component for generating object code for each file in a source program, and a binary scrambling component for generating scrambled binary data, wherein said scrambled binary data comprises binary data reorganized or reconfigured in a random manner wherein original functionality is preserved or could be restored;
      wherein the compiler is operable for compiling each source file further wherein the object code comprises scrambled binary data and has a randomized binary form; and
      wherein the binary scrambling system requires operation of at least one physical component of computer hardware architecture or microarchitecture for generating the scrambled binary data, and for performing computer operations for
         (1) randomizing CPU register allocation, wherein the register reallocation comprises substituting equivalent CPU registers;
         (2) reordering of functions;
         (3) randomizing function layout in binary output, wherein the layout order is randomized;
         (4) randomizing loop unrolling in the binary output and implementing loop unrolling randomness, wherein the loop unrolling is operable to avoid branching and optimize instruction set sequences, wherein limit for loop unrolling is changed and wherein partial unrolling is performed;
         (5) modification and randomization of one or more import tables and one or more lookup tables in the binary output;
         (6) introducing chaff code in the binary output;
         (7) introduction of no-ops and other obfuscation code, wherein dummy code or chaff is inserted in various locations around the binary to create additional entropy, further when chaff code is inserted into reachable areas, computer operations are implemented to ensure a no-op;
         (8) insertion of arbitrary code in unreachable areas of a binary;
         (9) substituting equivalent instructions in the binary output, comprising substitution of alternative instructions to perform semantically equivalent operations; and
         (10) changing the order of evaluation of expressions where legal to do so, comprising computer operations for performing one or more commutative operations;
(ii) implementing one or more scrambling algorithms for scrambling of the binary data;
(iii) carrying out additional said computerized operations wherein
  (1) one or more scrambled transformations or obfuscation transformations are applied to one or more of a computer program's local structure, control graph, and/or data structure to reader the program more difficult to understand and modify;
  (2) at least one binary code modification tool is linked with a program module containing code for performing a variety of scrambled transformations; and
  (3) additional scrambled transformations are performed to generate scrambled binary data, comprising scrambled transformations that
    add complexity to the binary data;
    remove useful information from the binary data; and
    add disinformation to the binary data;
  wherein said additional scrambled transformations are operable to make both static and dynamic analysis of the program more difficult, and protect against attacks by malware and computer viruses;
  wherein the removal of useful information comprises the removal of one or more symbol tables; and
  wherein the addition of disinformation comprises the addition of one or more misicading symbol tables;
(iv) implementing further said computerized operations by said hardware system for protecting against attacks by malware and computer viruses, wherein
  (1) said computerized operations are implemented by the hardware system in one or more of an apparatus, system, device, computer, database, and computer readable medium;
  (2) the hardware system comprises one or more hardware components that are required to run or execute the source program, said hardware components comprising one or more of a power supply, motherboard, hard disk, graphics card, and random access memory;
  (3) the hardware system further comprises one or more physical, non-abstract processors and memory storage devices for the processors; and
  (4) wherein additional said computerized operations are implemented by the hardware system in a physical, non-abstract heterogeneous distributed computing environment, wherein said computing environment comprises one or more physical, non-abstract distributed computing components comprising one or more remote file servers, computer servers, and memory storage devices, and wherein each of the distributed computing components is accessible by the processor via a physical, non-abstract communication network;
(v) providing security and protection against attacks by malware and computer viruses, wherein the object code that is generated by the compiler for each file comprises scrambled binary data, and wherein the system provides security against Zero Day Malware;
(vi) wherein compiling the source program with the compiler comprises
  (1) one or more code optimization processes;
  (2) one or more local optimizations for optimizing code;
  (3) one or more global optimizations; and
  (4) one or more processor-dependent optimizations;
  further wherein the compiler comprises one or more components for analyzing semantics within the source program, for analyzing syntax within the source program, and for generating object code for each file in the source program, and one or more binary scrambling components;
  further wherein the compiler comprises a front end and a backend, wherein the backend is dependent on the architectural framework of the system, and wherein the front end comprises one or more lexical analyzers, syntax analyzers and semantic analyzers;
  wherein said lexical analyzers isolate each part of a statement and tokenize each part as operands, operator, variable, and constants;
  wherein the lexical analysis phase reads the characters in the program and groups them into tokens that are sequence of characters having a collective meaning;
  wherein said syntax analyzers parse the token sequence and identifies the syntactic structure of the program;
  wherein said semantic analyzers are operable for checking for type errors and adding necessary semantic information to the parse tree;
  wherein the backend of the compiler comprises an intermediate code generator, a code optimizer and a code generator for generating object code for each file in the source program;
  wherein, with regard to the intermediate code generator, this phase of the compiler transforms parser tree into an intermediate language representation of the source program;
  wherein, with regard to the code optimizer, code optimization is utilized to modify the working code to a more optimal code, wherein the code optimization phase improves the intermediate code, so that faster running machine code will result;
  wherein the code generator takes the optimized intermediate representation of the source program as input and produces a target program or object program as output, and wherein the final phase of the compiler is the generation of the target code or machine code or assembly code;
  wherein memory locations are selected for each of the variables used by the program, and wherein intermediate instructions are then translated into a sequence of machine instructions that perform the same task, and wherein the back card performs the intermediate code generation, code optimization and generation for the compilation process;
  wherein each class file that is produced by the compiler has machine instructions in scrambled binary output format, and wherein the output file can be executed on a computer;
further wherein said binary scrambling system is required for carrying out physical, non-abstract computerized operations that are necessary for
  (i) the introduction of a significant level of entropy into the resulting binaries, while preserving semantic functionality and performance of the binary;
  (ii) scrambling binary data for each of the plurality of source files at the level of the compiler, wherein the probability of a 10 gadget ROP chain virus successfully working on a twenty megabyte binary scrambled in such a fashion is approximately $8 \times 10^{-15}$, 8 in a quadrillion or better; and (iii) scrambling binary data for each of the plurality of source files at the level of the compiler, wherein any type of scrambled code can be introduced, and any type of software program can be scrambled or obfuscated, comprising one or more of binary program images, byte-code images, Java™ class files, intermediate code forms produced by compilers, executable files, assembly language programs, and source code representations.

\* \* \* \* \*